US006852193B2

(12) United States Patent
Kneafsey et al.

(10) Patent No.: US 6,852,193 B2
(45) Date of Patent: Feb. 8, 2005

(54) SEMI-SOLID ONE- OR TWO-PART COMPOSITIONS

(75) Inventors: Brendan J. Kneafsey, Dublin (IE); John Guthrie, Kildare (IE); Gerard Coughlan, Dublin (IE)

(73) Assignee: Loctite (R&D) Limited, Dublin (IE)

( * ) Notice: Subject to any disclaimer, the term of this patent is extended or adjusted under 35 U.S.C. 154(b) by 0 days.

(21) Appl. No.: 10/276,416

(22) PCT Filed: May 30, 2001

(86) PCT No.: PCT/IE01/00072

§ 371 (c)(1),
(2), (4) Date: Nov. 15, 2002

(87) PCT Pub. No.: WO01/92434

PCT Pub. Date: Dec. 6, 2001

(65) Prior Publication Data

US 2003/0171467 A1 Sep. 11, 2003

(30) Foreign Application Priority Data

May 31, 2000 (IE) .......................................... 2000/0440

(51) Int. Cl.[7] .............................................. C09J 4/00
(52) U.S. Cl. ...................... 156/326; 524/369; 523/176; 206/813; 428/447; 428/500
(58) Field of Search .......................... 156/326; 524/369, 524/757; 523/176; 206/813; 428/447, 500

(56) References Cited

U.S. PATENT DOCUMENTS

| | | | |
|---|---|---|---|
| 2,895,950 A | 7/1959 | Kreible | 260/89.5 |
| 3,043,820 A | 7/1962 | Kreible | 260/89.5 |
| 3,218,305 A | 11/1965 | Krieble | 260/89.5 |
| 3,425,988 A | 2/1969 | Gorman | 260/47 |
| 3,547,851 A | 12/1970 | Frauenglass | 260/23.5 |
| 3,591,438 A | 7/1971 | Toback et al. | 156/310 |
| 3,599,438 A | 8/1971 | Blackwell et al. | 62/22 |
| 3,616,040 A | 10/1971 | Toback | 156/310 |
| 3,625,875 A | 12/1971 | Frauenglass | 260/17 A |
| 3,625,930 A | 12/1971 | Toback et al. | 260/89.5 |
| 3,631,154 A | 12/1971 | Kawaguchi et al. | 260/76 |
| 3,651,036 A | 3/1972 | Watanabe et al. | 260/89.5 |
| 3,672,942 A | 6/1972 | Neumann et al. | 117/62.2 |
| 3,720,656 A | 3/1973 | Manaka | 260/89.5 |
| 3,846,363 A | 11/1974 | Ando et al. | 260/29.6 BM |
| 3,890,407 A | 6/1975 | Briggs, Jr. et al. | 260/878 R |
| 3,898,349 A | 8/1975 | Kehr et al. | 427/36 |
| 4,007,323 A | 2/1977 | Malofsky | 526/312 |
| 4,008,341 A | 2/1977 | Kehr | 427/44 |
| 4,018,851 A | 4/1977 | Baccei | 260/859 R |
| 4,092,376 A | 5/1978 | Douek et al. | 260/884 |
| 4,106,971 A | 8/1978 | Briggs, Jr. et al. | 156/310 |
| 4,112,031 A | 9/1978 | Gohlisch | 264/26 |
| 4,167,616 A | 9/1979 | Bollinger | 526/197 |
| 4,215,201 A | 7/1980 | Cerron | 435/290 |
| 4,257,928 A * | 3/1981 | Vachon et al. | 524/386 |
| 4,287,330 A | 9/1981 | Rich | 526/270 |
| 4,309,526 A | 1/1982 | Baccei | 528/75 |
| 4,348,503 A | 9/1982 | Bachmann | 525/455 |
| 4,384,064 A * | 5/1983 | Trotter et al. | 524/239 |
| 4,429,088 A | 1/1984 | Bachmann | 526/135 |
| 4,430,480 A | 2/1984 | Melody et al. | 525/160 |
| 4,447,607 A | 5/1984 | Johnson | 544/246 |
| 4,483,956 A * | 11/1984 | Uchiyama | 524/384 |
| 4,497,916 A | 2/1985 | Cooke et al. | 523/176 |
| 4,515,724 A | 5/1985 | Ritter | 260/410 |
| 4,533,422 A | 8/1985 | Litke | 156/307.3 |
| 4,639,475 A | 1/1987 | Dierichs et al. | 523/164 |
| 4,656,229 A | 4/1987 | Chiao | 525/518 |
| 4,676,868 A | 6/1987 | Riley et al. | 156/307.3 |
| 4,808,638 A | 2/1989 | Steinkraus et al. | 522/24 |
| 4,963,220 A | 10/1990 | Bachmann et al. | 156/307.3 |
| 4,990,281 A | 2/1991 | Clark | 252/184 |
| 5,371,131 A | 12/1994 | Gierenz et al. | 524/394 |
| 5,433,775 A | 7/1995 | Gardenier et al. | 106/211 |
| 5,610,251 A | 3/1997 | Kneafsey et al. | 526/264 |
| 5,718,977 A * | 2/1998 | Pocius | 428/422 |

FOREIGN PATENT DOCUMENTS

JP       54 107993       6/1979       C08F/2/44

\* cited by examiner

*Primary Examiner*—Margaret G. Moore
(74) *Attorney, Agent, or Firm*—Steven C. Bauman

(57) ABSTRACT

A composition including at least one anaerobically polymerizable compound; and at least one condensation product of an aldehyde and or ketone/with a polyol. The invention also provides a composition as described above which is in the form of a soft solid, for example, in the form of a stick. A two-part composition is provided, comprising a first part containing at least one polymerizable compound; and a second part containing at least one curing component for polymerizing the composition, wherein at least one of the first or second parts additionally comprises at least one gelling or solidifying agent. A kit is provided comprising the composition according to the invention which includes at least one primer component and at least one carrier solvent for the primer component, and a second composition which includes at least one anaerobically polymerizable compound and at least one condensation product of an aldehyde and or ketone/with a polyol. A pack is also provided, comprising: a shaped mass of a composition which includes at least one anaerobically polymerizable compound and at least one condensation product of an aldehyde and or ketone/with a polyol, and a container (1) for the composition. The container (1) has a mechanism for expelling the shaped mass.

44 Claims, 1 Drawing Sheet

SEMI-SOLID ONE- OR TWO-PART COMPOSITIONS

FIELD OF THE INVENTION

The present invention relates to semi-solid one or two-part compositions particularly well suited to use in the bonding, sealing or coating of many different types of substrate. The compositions of the present invention are for the most part acrylic-based. Included among the compositions of the present invention are anaerobic compositions.

BRIEF DESCRIPTION OF RELATED TECHNOLOGY

It is well recognised that an exact split between anaerobic products which are based on acrylics and structural acrylics, both of which are within the acrylic family is difficult due to the close relationship between them. Both are redox-initiated free radical polymerizing. The present application follows the teaching and the terminology of Boeder in his review of anaerobic acrylics and structural acrylics published in "Structural Adhesives, Chemistry and Technology," ed. S. R. Hartshorn, Plenum Press N.Y. 1986 in particular pages 217–247. The disclosure of this review is hereby incorporated herein by reference. Structural adhesives tend to be considered as suitable adhesives for bonding "active" components, i.e., components that may be subject to later external forces. Anaerobic compositions are in general considered to be more appropriate for applications where these subsequent forces do not occur.

The main distinction between these two types of acrylics is the cure mechanism. In anaerobic compositions the exclusion of oxygen is the main source of initiation of cure and cure will not take place to a substantial extent until oxygen is excluded. In structural adhesives, a cure system is required as the exclusion (absence) of oxygen is not sufficient to cure the composition. Accordingly the latter have tended to be formulated as two-part compositions—the first part containing the polymerizable acrylic monomer or oligomer, the second containing the component(s) which cause the polymerizable acrylic monomer or oligomer to polymerize curing the composition (the "cure system" or "curative").

Accordingly the two different aspects of the present invention are described as one-part (usually referring to anaerobic compositions) or two-part systems for ease of discussion, but it will be appreciated that the two terms are not mutually exclusive.

It should also be noted that particularly for non-metallic substrates or at least substrates with substantially no metallic ions present initiation of cure of anaerobic products is difficult as metal ions are known to participate in the anaerobic cure mechanism. Therefore while cure of anaerobic products on for example plastics substrates may take place on exclusion of oxygen, it usually does so only at an undesired (slow) rate. In order to promote cure (particularly on such substrates), primer compositions containing cure-promoting primer components are employed. The cure-promoting primers are described in detail below. The primer and the anaerobic product could be considered as a two-part system as they are provided separately. However for ease of discussion herein the anaerobic product and the primer will be referred to as such, and not as a two-part system.

It is intended to include within the definition of primer compositions of the present invention those compositions where the primer is in an inert carrier solvent. It is desirable that the inert carrier solvent evaporates after application of the primer composition to allow for subsequent bonding with anaerobic compositions of the present invention. It is usual for a primer composition not to contain any polymerizable component as such compositions would most often be regarded as two-part compositions as the polymerizable component usually takes part in the polmerization process. It is not intended however to exclude certain formulations of anaerobic compositions and associated primers from within the ambit of the term "two-part" as used herein. If the primer component is formulated in a polymerizable monomer or polymerizable oligomer for example alkyl methacrylate esters such as methyl or ethyl methacrylate i.e. where the polymerizable monomer or polymerizable oligomer acts as the solvent, it would be usual to consider such a primer and the anaerobic product as a two-part composition. The distinction between this composition and those where an inert carrier solvent is used is that where the solvent is a polymerizable monomer or polymerizable oligomer it is not likely to evaporate after application and usually it would participate in the polymerization process finding its way into the cured product. Where the solvent is an invert carrier solvent it usually evaporates and does not take part in the polymerization process.

Two-part compositions have long been formulated. Formulating curable compositions with certain of the components in each of two parts has been necessary in some instances, for example to provide desirable storage stability, and desirable in certain other instances for example where the two parts of the compositions are mixed in different ratios for different applications.

Where compositions are formulated as two-part compositions one option is to place the polymerizable monomer/oligomer in a first part, and the curing component(s) e.g. the polymerization initiator in the second part. Other components if present, such as stabilisers, accelerators etc. are assigned to either the first or second part as appropriate and as will be apparent to the person skilled in the art.

Due to the necessity to mix the components of two-part curable compositions each component is usually a liquid. Typically the two-parts of the composition are held in separate chambers of a packaging. The packaging may have a mechanism to dispense the components which also mixes the components in the desired ratio on dispensing. Such packaging is well known and includes for example dispensing syringes and the like. For ease of reference a first part of the composition (usually the part containing the polymerizable monomer or oligomer) is referred to as "part A" while the second part, normally containing the cure system is referred to as "part B". Due to the very similar components used in anaerobic compositions and in structural adhesives the compounds are discussed generally. It will be apparent to the person skilled in the art which components are desirable in the particular composition being formulated.

U.S. Pat. No. 4,497,916 (Cooke et al) describes a one-part sealing or adhesive composition comprising a stable slurry of solid meltable wax-like particles dispersed in a liquid adhesive or sealant composition, such as an anaerobic adhesive or sealant, which may be caused to cure at a time later than the time of application. The composition may be applied to threaded bolts or other articles by pumping the slurry through a heated applicator head to dispense homogeneous liquid on the article which hardens on cooling to a non-mobile setable coating. The solid disperse phase described includes an organic substance having the following essential properties (a) a melting point or range above ambient temperature; (b) substantial insolubility in the continuous phase at and below ambient temperatures; and (c) substantial solubility in the continuous (liquid) phase at temperatures above the melting point of the composition. The formulation of such adhesives necessitates the inclusion of large quantities of gelling agents. The '916 patent does not mention the possibility of formulating the composition as a stick composition. It would be desirable to provide compositions with required lesser amounts of compositions.

Various types of adhesive compositions are available commercially ranging from low viscosity (liquid) compositions to gels and other medium viscosity compositions to higher viscosity products such as pastes, and soft-solid products.

It is known to thicken or gel adhesive such as cyanoacrylate adhesives with polymethylmethacrylate or thixotropic agents such as those described in U.S. Pat. Nos. 4,447,607 and 4,533,422 (Litke).

It is also known for instance to formulate adhesives as "stick" compositions. The patent literature on stick adhesives is extensive and covers a broad range of adhesive types, from emulsion adhesives through solvent based adhesives, to contact adhesives, as well as gelling and solidifying additives for the preparation of the sticks ranging from thermosetting through natural polymers to inert fillers. A well known example of one such adhesive stick sold under the trade name PrittStick™ by Henkel KGaA which is an emulsion-based adhesive.

In the patent literature the following patents typify the type of composition in which adhesive components have been formulated as soft-solids, and more particularly sticks. U.S. Pat. No. 5,433,775 discloses an adhesive stick consisting of a water based preparation of starch derivatives and a soap gel as the shaping gel-forming component. See also U.S. Pat. No. 5,371,131.

U.S. Pat. No. 3,846,363 relates to an adhesive crayon composition containing a sorbitol-benzaldehyde reaction product as an additive. U.S. Pat. No. 4,639,475 discloses an adhesive stick composed of the reaction product of sorbitol and/or xylitol and benzaldehyde as the gel-forming composition together with an adhesive resin which is the reaction product of methyl vinyl ether/maleic acid anhydride copolymers with partially neutralised acid phosphate esters of non-ionic wetting agents of the lower alkylene oxide adduct type.

Japanese unexamined patent application laid open (Kokai) 51-103939 describes a stick-like epoxy adhesive and a stick-like epoxy hardening agent which is used therewith. The sticks are obtained by suitably compounding gelling agent or/and water and/or organic solvent with liquid or solution type epoxy adhesive and epoxy hardening agent.

DE 199 57 677 A1, published after the priority date of the present application, of Henkel KGaA describes a cyanoacrylate adhesive, coating or sealing material which also contains at least one condensation product of an aldehyde or ketone with a polyol. The adhesive may be in stick form.

While certain forms of one or two-part compositions have been used it is desirable nonetheless to provide an alternative form for these products. Furthermore while a wide variety of sticks have been described, no prior publication has suggested that an anaerobically polymerizable monomer or oligomer could be made in stick form at all, let alone without loss of functionality. It would be advantageous to provide an anaerobically polymerizable monomer or oligomer composition in stick form. Furthermore it would be desirable to provide at least one part of a two-part composition in stick form and more particularly it would be desirable to provide both parts of a two-part composition in stick form.

SUMMARY OF INVENTION

In particular the present invention provides a composition including
(i) at least one anaerobically polymerizable compound (usually a monomer or oligomer); and
(ii) at least one condensation product of an aldehyde and/or ketone with a polyol.

The composition is suitably in the form of a soft-solid, for example in the form of a stick.

Any suitable acrylate or methacrylate, monomer or oligomer or resin may be used. The polymerisable compound may be selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes. Particularly desirable monomeric or oligomeric products include acrylic and especially methacrylic monomers or oligomers. Suitable acrylates and methacrylates are those used in polymerisable systems such as disclosed in U.S. Pat. No. 4,963,220 (Bachmann et. al.), and U.S. Pat. No. 4,215,209 (Ray-Chaudhuri et al). Particularly preferred are hydroxyl-containing methacrylates especially hydroxylalkyl methacrylates such as hydroxypropyl methacrylate. Also useful are methylmethacrylate, polyfunctional methylacrylates, silicone diacrylates and polyfunctional acrylated urethanes of the type known to be useful in formulating adhesives (e.g. as disclosed in U.S. Pat. No. 4,092,376 of Douek et al) or a thiol-ene (e.g. as disclosed in U.S. Pat. Nos. 3,661,744, 3,898,349, 4,008,341 or 4,808,638).

Suitably the component (monomer or oligomer) is selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes, for example di-, tri- or tetra-methacrylates.

Exclusion of oxygen (most usually air) may be sufficient to initiate cure of the anaerobic system described above. However the composition may benefit from the addition of an initiator suitable for initiating cure of an anaerobic system. This initiator may be formulated with the anaerobically polymerizable monomer or oligomer in a one-part composition or alternatively may be formulated as a primer or as a second part of a two-part system. It would provide convenience if the second part of the anaerobic system also was presentable as a semi-solid by inclusion of a gelling agent. Desirably the gelling agent is as described above i.e. at least one aldehyde and/or ketone condensation product with a polyol.

These polymerisable compounds are typically formulated in a composition which contains at least sufficient components to make the composition curable. The polymerizable compound may be for example a dimethacrylate of polyalkoxy alcohols, methacrylates, the product of reaction of hydroxyethyl methacrylate (e.g. hydroxyethyl methacrylate) with an acid anhydride, polyurethane acrylates, dicyclopentyl methacrylates and triallylisocyanurates. The person skilled in the art will, depending on the polymerizable monomer or oligomer selected, consider any further appropriate components.

Particularly desirable are acrylate and methacrylate compounds.

Suitably the anaerobically polymerizable monomer or oligomer is selected from those polymerisable compounds of the formula:

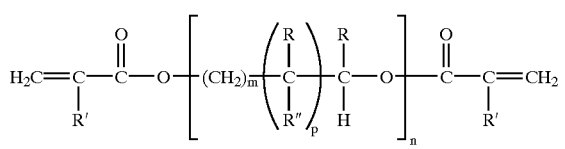

where R is a radical selected from hydrogen, $C_1$–$C_4$ alkyl, or $C_1$–$C_4$ hydroxyalkyl or

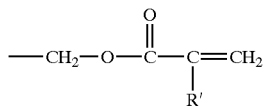

radicals, R' is selected from hydrogen, halogen, and $C_1$–$C_4$ alkyl, OH; and
R" is selected from hydrogen, —OH radical, and

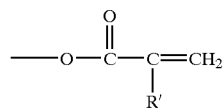

radicals; m is an integer equal to at least one, e.g. from 1 to 8 or higher, for instance from 1 to 4, inclusive, n is an integer equal to at least 2, for example from 2 to 20 or more, inclusive, and p is 0 or 1.

The composition may further include a reducing agent, as part of a redox cure system. The reducing agent may be selected from:

(i) arylamines of the formula:

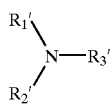

in which $R_{1'}$ is an optionally substituted aryl radical, more especially an optionally alkyl-substituted phenyl radical, $R_{2'}$ has the same meaning as $R_{1'}$ or is an optionally substituted, linear or branched alkyl radical and $R_{3'}$ is a linear or branched alkyl radical which may be substituted, but contains at least one hydrogen atom in the alpha-position to the nitrogen and any two of $R_1$, to $R_3$, may together form a mono- or poly-cyclic ring structure, which may optionally be a fused ring structure, and which in turn may be substituted;

(ii) a compound having the formula

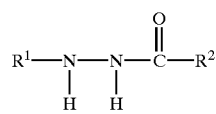

wherein $R^1$ is phenyl substituted with $C_1$–$C_4$ alkyl group and $R^2$ is selected from the group consisting of hydrogen, alkyl, cycloalkyl, alkenyl, cycloalkenyl, aryl, alkoxy, aryloxy, carbonyl, amino and the following groups:

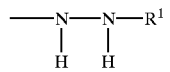 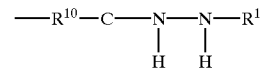

wherein $R^{10}$ is selected from the group consisting of alkyl groups containing one to about 10 carbon atoms;

(iii) sulphonyl hydrazines; or (iv) tetrahydroquinolines

Particularly desirable are compositions wherein the reducing agent is selected from (i) N,N-dimethyl-p-toluidine, or N,N-diethyl-p-toluidene;

(ii) 1-acetyl-2-phenyl hydrazine; 1-acetyl-2(p-tolyl) hydrazine, and 1-formyl-2-phenyl hydrazine;

(iii) paratoluene sulphonylhydrazine (iv) 1,2,3,4,-tetrahydroquinoline. Suitable concentrations of the reducing agent include amounts from about 0.05% to about 10%, such as about 0.5% to about 5% for example from about 1% to about 3% by weight based on the total weight of the composition.

The composition may also further comprise an oxidizing agent; as part of the redox radical generation system. The oxidizing agent may be a peroxy compound, such as hydroperoxide for example cumene hydroperoxide.

The oxidizing agent may be present in amounts from about 0.5% to about 10%, for example about 1% to about 5% for example from about 1% to about 3% by weight based on the total weight of the second part of the composition.

In order to increase cure speed the composition may further comprises an accelerator such as a cyclic sulfimide such as saccharin or saccharin derivatives, or acrylic or methacrylic acids. Typical amounts of the accelerator include amounts from about 0.01% to about 10% for example from about 0.1% to about 0.75% by weight based on the total weight of the composition. To extend the shelf-life of the product a stabiliser may be used e.g. a quinone or a metal scavenger for example a Na salt of ethylenediamine tetra acetic acid. Most desired compositions are those where the anaerobically polymerizable compound is an acrylic or methacrylic compound, particularly hydroxy propyl methacrylate.

The invention also provides a composition including (i) at least one polymerizable compound; and (ii) at least one gelling or solidifying agent which is a condensation product of an aldehyde and/or ketone with a polyol wherein the at least one polymerizable compound is selected from at least one of the following: olefinically unsaturated systems such as acrylates, methacrylates, styrene and derivatives thereof, maleate esters, fumarate esters, unsaturated polyester resins, alkyd resins, thiol-ene compositions, and acrylate, methacrylate, and/or vinyl terminated resins including silicones and urethanes. For the purposes of this invention the term acrylate in general is not intended to embrace cyanoacrylates.

The invention also provides a kit comprising:

(i) a first composition including:

(a) at least one primer component;

(b) at least one carrier solvent for the primer component; and (ii) a second composition which is a composition as described above.

An inert carrier solvent for use with a primer/kit of the invention may be the first (primer) composition comprises an organic solvent in which the primer component is stable. Component (i)(b) may be an organic solvent such as ethanol, methanol, acetone, methyl ethyl ketone, 1,1,1-trichloroethane, 1,1,2-trichloro-1,2,2,-trifluoroethane or mixtures thereof with each other or with other solvents such as an azeotropic mixture of 1,1,2-trichloro-1,2,2,-trifluoroethane with acetone. Desirably the solvent is ethanol. The person skilled in the art will be aware of the type of solvent which may be used.

The function of the solvent is to provide a suitable concentration of the primer component so that a coating of selected thickness can be applied to a surface. Therefore, any common solvent in which the primer component is stable will suffice. The solvent will usually dissolve the primer component though dissolving is not essential provided the solvent acts to provide a dilute (and thus disperse) form of the primer component.

Desirably the first composition further includes a gelling or solidifying component. More convenience in application is available where both compositions are in soft-solid form, for example stick form.

The invention also provides a two-part composition comprising:

(i) a first part containing at least one polymerizable compound (suitably a monomer of oligomer); and (ii) a second part containing at least one curing component for (curing) polymerizing the composition wherein at least one of the first or second parts additionally comprises:

(iii) at least one gelling or solidifying agent; and at least one of the conditions (a) to (d) is fulfilled:

(a) the at least one polymerizable compound is not an epoxy;

(b) the at least one polymerizable compound is selected from at least one of the following: olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes;

(c) the at least one polymerizable compound is anaerobically polymerizable, (d) the at least one polymerizable compound is free radically polymerisable (desirably in the absence of air).

Desirably both parts of the two-part compositions of the invention include component (iii) so that both parts may be formulated as semi-solids.

Suitably polymerizable compound is selected from olefinically unsaturated systems such as acrylates, methacrylates, styrene, maleate esters, fumarate esters, unsaturated polyester resins, alkyd resins, thiol-ene compositions, and acrylate, methacrylate, or vinyl terminated resins including silicones and urethanes.

The polymerizable compound may be a compound of the formula

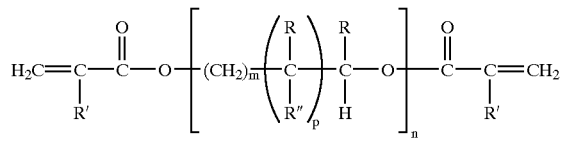

where R is a radical selected from hydrogen, $C_1$–$C_4$ alkyl, or $C_1$–$C_4$ hydroxyalkyl or

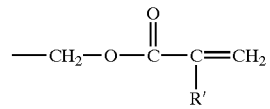

radicals, R' is selected from hydrogen, halogen, and $C_1$–$C_4$ alkyl, OH; and

R" is selected from hydrogen, —OH radical, and

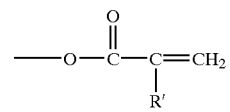

radicals; m is an integer equal to at least one, e.g. from 1 to 8 or higher, for instance from 1 to 4, inclusive, n is an integer equal to at least 2, for example from 2 to 20 or more, inclusive, and p is 0 or 1.

Olefinically unsaturated systems such as acrylates and methacrylates are particularly desirable. For example hydroxy propyl methacrylates, styrene, maleate esters, fumarate esters, unsaturated polyester resins, alkyd resins, thiol-ene compositions, and acrylate, methacrylate, or vinyl terminated resins including silicones and urethanes.

While the present invention is described with respect to one- and two-part compositions it will be appreciated that certain compositions could be formulated as having three or more parts i.e. the invention includes multi-part systems.

The second part includes at least one adhesive curing system (which may itself be a one-, two- or multi-component system) particularly known to be active for the initiation of a cure reaction or polymerisation reaction in acrylate/anaerobic/redox activatable adhesives. Minor amounts of other compounds such as organic amines or excess organic acid or a transition metal salt or complex may also be included in the compositions.

Desirably the second part of the composition further includes a reducing agent. The reducing agent may be selected from one or more of:

(i) arylamines of the formula:

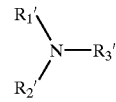

in which $R_{1'}$ is an optionally substituted aryl radical, more especially an optionally alkyl-substituted phenyl radical, $R_{2'}$ has the same meaning as $R_{1'}$ or is an optionally substituted, linear or branched alkyl radical and $R_{3'}$ is a linear or branched alkyl radical which may be substituted, but contains at least one hydrogen atom in the alpha-position to the nitrogen and any two of $R_1$, to $R_3$, may together form a mono- or poly-cyclic ring structure, which may optionally be a fused ring structure, and which in turn may be substituted;

(ii) a compound having the formula

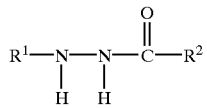

wherein $R^1$ is phenyl substituted with $C_1$–$C_4$ alkyl group and $R^2$ is selected from the group consisting of hydrogen, alkyl, cycloalkyl, alkenyl, cycloalkenyl, aryl, alkoxy, aryloxy, carbonyl, amino and the following groups:

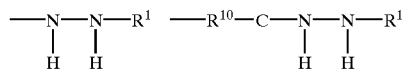

wherein $R^{10}$ is selected from the group consisting of alkyl groups containing one to about 10 carbon atoms;

(iii) sulphonyl hydrazines;

(iv) tetrahydroquinones;

(v) hydropyridines; or (vi) beta keto esters.

Particular examples of reducing agent include those selected from one or more of:

(i) N,N-dimethyl-p-toluidine, or N,N-diethyl-p-toluidene;

(ii) 1-acetyl-2-phenyl hydrazine; 1-acetyl-2(p-tolyl) hydrazine; and 1-formyl-2-phenyl hydrazine;

(iii) paratoluene sulphonylhydrazine;

(iv) 1,2,3,4,-tetrahydroquinone;

(v) a dihydropyridine or tetrahydropyridines;

(vi) methylcyclohexane carboxylate, ethylcyclohexane carboxylate, methylcyclopentane carboxylate, ethylcyclopentane carboxylate.

More particularly the reducing agent may be selected from one or more of N-butyl-2-propyl-3,5-diethyl-1,2-dihydropyridine, N-phenyl-2-propyl-3,5-diethyl-1,2-dihydropyridine, N-(4'-methoxyphenyl)-2-propyl-3,5-diethyl-1,2dihydropyridine, N-(cyclohexyl)-2-propyl-3,5-diethyl-1,2 dihydropyridine, N-benzyl-1,4-dihydronicotinamide, N-trimethylsilyl-1,4-dihydropyridine, 1,4-dihydropyridine, ethyl-2,4-dimethyl-1,4-dihydronicotinate, 2-methyl-3-phenyl-3,4,5,6-tetrahydropyridine or 2-benzyl-3-phenyl-3,4,5,6-tetrahydropyridine.

Desirably amounts of reducing agent include amounts from about 0.05% to about 10%, such as about 0.5% to about 5% for example from about 1% to about 3% by weight on the total weight of the second part of the composition.

The first part of the two-part composition further comprises an oxidising agent, such as a compound containing a peroxy group for example at least one of the following:

(i) peresters;

(ii) hydrogen peroxide;

(iii) alkyl and dialkyl peroxides;

(iv) hydroperoxides; and (iv) acryl peroxides, diaryl peroxides, acryl peroxides and diaryl peroxides.

Named oxidising agents include the following: hydrogen peroxide, benzoyl peroxides, or t-butyl perbenzoates.

Desired amounts of the oxidising agent include amounts from about 0.5% to about 10%, for example about 1% to about 5% for example from about 1% to about 3% by weight based on the total weight of the first part of the composition.

If desired the second part of the composition may further comprise a solvent, such as an organic solvent eg. ethanol, methanol, acetone, methyl ethyl ketone, 1,1,1-trichloroethane, 1,1,2-trichloro-1,2,2,-trifluoroethane or mixtures thereof with each other or with other solvents such as an azeotropic mixture of 1,1,2-trichloro-1,2,2,-trifluoroethane with acetone.

A further optional component in either part of the composition may be a metal component e.g. a transition metal, or a salt or complex of a transition metal. The transition metal may be one or more of Fe, Cu, Cr or Mn. More particularly the metal component is one or more of Cu(II) 2-ethylhexanoate or Cu(II) acetylacetonate. Those skilled in the art will decide which part is most suited for inclusion of the optional metal component.

Suitably in the two-part composition and/or the kit described above the gelling or solidifying agent is at least one condensation product of an aldehyde with a ketone.

Free-radical accelerators such as tertiary amines, as disclosed in U.S. Pat. No. 3,890,407, and sulfimides, such as 3-oxo-2,3-dihydrobenz[d]isothiazole-1,1-dioxide, commonly known as benzoic sulfimide or saccharin, may be incorporated (usually in the first part of the composition). Concentrations of sulfimides would usually be less than 10% by weight of (the first part of) the composition, the preferred range being from about 0.1% to about 3.0%. Cyclic sulfimide useful in the present invention include those of the formula:

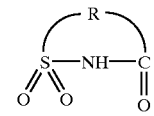

wherein R is a divalent aromatic nucleus of 6 carbon atoms which bonds the sulfimide group in a heterocyclic ring or a polynuclear heterocyclic ring. Such cyclic sulfimides are well known in the art as accelerators which improve the curing and storage properties of anaerobic adhesives. The compound o-benzoic sulfimide (saccharin) is most preferred. Metal scavengers are well known to those skilled in the art as useful components to stabilise compositions and may include many types of ligands which may complex a metal atom. One such compound which is particularly useful as it scavenges for Co, Cu and Fe is ethylenediamine tetra acetic acid and in particular the Na salt thereof.

Other potential components include tougheners such as chlorosulphonated polyethylenes.

The present invention provides a one- two- and multi-part compositions suitable for formulation/presentation in stick form. The compositions may be used for a wide range of applications. The present invention provides the compositions in easy to handle forms so that compositions of the invention can be used for all the purposes for which they were conventionally used as their formulation in the specific form of the present invention does not interfere with such use. The compositions of the present invention allow for ease of application and/or handling, and allow for accuracy in application without running. With two- or multi-part systems each of the component may be formulated in the easy to handle form of the invention allowing for example ease of application of a second part of a two-part system to a surface to which the first part of the composition has been already applied.

The cure-promoting compositions of the present invention have been found to promote (accelerate) curing of otherwise slow curing products.

The gelling or solidifying agent of the various aspects of the present invention is suitably the product of the ketone condensation reaction between an aldehyde and a polyol.

The aldehyde may be benzaldehyde, 3-chlorobenzaldehyde or 3-fluorobenzaldehyde especially benzaldehyde. Particularly useful solidifying or gelling agents include those where the polyol is sorbitol, xylitol or mannitol especially sorbitol.

Desirably the gelling or solidifying agent is an acetal of sugar, particularly an acetal of sorbitol such as dibenzylidene sorbitol.

Desirably the gelling or solidifying agent is at least one aldehyde and/or ketone condensation product with a polyol.

The use of the particularly desirable gelling agents in the compositions of the present invention, i.e. acetals of alcohols and aldehydes/ketones have a high gelling efficiency and therefore can be added at relatively low concentrations usually of the order of 1–5% and therefore compositions formulated with such low amounts do not do not have disadvantages associated with compositions which have high concentrations of other gelling agents.

Suitable polyols include those with at least one of a 1,2-diol, 1,3 diol or 1,4 diol structure. The diols may additionally have other groups such as ether, acid, amido, cyano, hemiacetal or halogen. Examples of suitable polyols include 1,2-ethandiol, 1,3-propandiol, 1,2-propandiol, 2,3-butandiol, 1,4-butandiol, 2,2-dimethyl-1,3-propandiol, 2,2-bis(hydroxymethyl)-1,3-propandiol, 2-(bromomethyl)-2-(hydroxymethyl)-1,3-propandiol, 1,3,4-butantriol, 1-phenyl-1,2,3-propantriol, 1,2-hexandiol, neopentylglycol, 1,4-bishydroxymethylcyclohexane, 2-methyl-1,3-propandiol, hexantriol-(1,2,6), 2-(2-hydroxyethoxy)butan-1, 3,4,-triol, glycerine, di and polyglycerine, diglycerindiacetate, trimethylolpropane, di-(trimethylolpropane), trimethylolethane, pentaerythritol, bicyclo [2.2.1] heptane-2,3,5,6-tetrol, 2,2,3,3-tetrahydroxybutandiacid, dipentaerythritol, sorbitol, formitol, xylitol, inositol, glucitol, glucose, saccharose/sucrose, starch, cellulose, ascorbic acid, partially or fully hydrolysed polyvinylacetate, 9,10-dihydroxy stearic acid methyl ester, diacetylsorbitol and methylglyceride.

Most suitable polyols are sorbitol, xylitol and mannitol especially sorbitol.

Suitable aldehyde or ketones include those which have at least one substituted or unsubstituted aromatic, heteroaromatic or alicylic ring. These polyols may have additional groups such as ether ester, amide, cyano and halogen.

Examples of ketones include cyclopentanone, cyclohexanone, cycloheptanone, 1-(3,3-dimethylcyclohexyl)-ethanone, 1-cyclopropylethanone, 3-methyl-5-propylcyclohex-2-en-1-one, dicyclopropylmethanone, 4-tert-butylcyclohexanone, dicyclohexylmethanone, 4-methylcyclohexanone, 1-(1-methylcyclopropyl)-ethanone, (4-chlorophenyl)-cyclopropyl-methanone, 1-(1H-pyrrol-2-yl)-ethanone, 1-(2,4,6-trimethylphenyl)-ethanone, 1-(2-furanyl)-2-propanone, 1-(2-naphthalenyl)-ethanone, 1-(2-thienyl)-1-propanone, 1-(4-bromophenyl)-ethanone, 1-(4-methoxyphenyl)-ethanone, 1-(naphthalenyl)-ethanone, 1,1-diphenyl-2-propanone, 1,2-diphenylethanone, 1,3-diphenyl-2-propanone, 1-phenyl-1-butanone, 1-phenyl-1-decanone, 1-phenyl-1-dodecanone, 1-phenyl-1-hexanone, 1-phenyl-1-octanone, 1-phenyl-1-pentanone, 1-phenyl-1-penten-3-one, 1-phenyl-1-tetradecanone, 1-phenyl-2-butanone, 1-phenyl-2-propanone, 1-pyrazinyl-ethanone, 2,2,2-trifluoro-1-phenyl-ethanone, 1-(2-furanyl)-ethanone, 1-(2-pyridinyl)-ethanone, 1-(2-thienyl)-ethanone, 4-chloro-1-(4-fluorophenyl)-1-butanone, 4-phenyl-2-butanone, 1-phenyl-ethanone, bis-(2-hydroxyphenyl)-methanone, bis-(4-chlorophenyl)-methanone, cyclopentylphenylmethanone, cyclopropyl(4-methoxyphenyl)-methanone, cyclopropyl-(4-methylphenyl)-methanone, cyclopropyl-2-thienyl-methanone, cyclopropylphenylmethanone, 1,5-diphenyl-1,4-pentadien-3-one, phenyl-2-pyridinyl-methanone, 2-bromo-1-(4-nitrophenyl)-ethanone, 2-naphthalenylphenyl-methanone, 3-chloro-1-phenyl-1-propanone, 4-(4-hydroxyphenyl)-2-butanone, 4-(4-methoxyphenyl)-3-buten-2-one, 1-(4-pyridinyl)-ethanone, 1-(4-hydroxyphenyl)-ethanone, 1-phenyl-1-propanone, 4-phenyl-3-buten-2-one, diphenylmethanone, 1-phenyl-2-butanone, 1-phenyl-2-buten-1-one, bis-(4-methylphenyl)-methanone, 2-methyl-1-phenyl-1-propanone, 2-chloro-1-phenyl-ethanone, cyclopropyl-(4-fluorophenyl)-methanone, 1-(p-methoxyphenyl)-2-propanone, cyclohexylphenylmethanone and phenyl-(2-thienyl)-methanone.

The following aldehydes are exemplary for use in the present invention: benzaldehyde, 3-chlorobenzaldehyde, 4-chlorobenzaldehyde, 2,6-dichlorobenzaldehyde, 2,4-dinitrobenzaldehyde, 3,4-dichlorobenzaldehyde, 3-fluorobenzaldehyde, 4-bromobenzaldehyde, 2-methyltetrahydrobenzaldehyde, tetrahydrobenzaldehyde, 2-methyl-5-isopropylcyclopenten-1-aldehyde, 2,2,4-trimethylcyclohexa-4,6-dien-1-aldehyde, 3(4)-methyl-1-propylcyclohexen-3-aldehyde, 1,3(4)-dimethylcyclohexen-3-aldehyde, 2-methyl-1-propylcyclohexen-3-aldehyde, 3-cyclohexen-1-aldehyde, 2,3,4,5,6-pentafluorobenzaldehyde, 2,4,6-trihydroxybenzaldehyde, 4-tolylacetaldehyde, 2-methylbenzaldehyde, 4-hydroxybenzaldehyde, 3-methylbenzaldehyde, 2-hydroxy-1-naphthalaldehyde, 4-methylbenzaldehyde, 3,5-dimethoxy-4-hydroxybenzaldehyde, cinnam-aldehyde, 3-nitrobenzaldehyde, 2-pentylcinnamaldehyde, 4-diethylaminobenzaldehyde, 4-methoxybenzaldehyde, 2-phenylpropionaldehyde, 2-methoxycinnamaldehyde, 4-methylbenzaldehyde, phenoxyacetaldehyde, methylpyrrol-2-aldehyde, 2,5-dimethoxytetrahydrofuran-3-aldehyde, 2,5-dipropyl-3,4-dihydropyran-2-aldehyde, 2,5-diethyl-3,4-dihydropyran-2-aldehyde, 2,5-diisopropyl-3,4dihydropyran-2-aldehyde, 2,5-dimethyl-3,4-dihydropyran-2-aldehyde, 2,5-dibutyl-3,4-dihydropyran-2-aldehyde, thiophen-3-aldehyde, indol-3-aldehyde, pyridine-3-aldehyde, pyridine-4-aldehyde and n-methylpyrrole-2-aldehyde.

Desirable aldehydes include benzaldehyde, 3-chlorobenzaldehyde and 3-fluorobenzaldehyde.

Particular acetals and ketals include: di-O-benzylidenmannitol, di-O-(2-chlorobenzylidene)mannitol, di-O-(4-nitrobenzylidene)mannitol, di-O-(3-fluorobenzylidene)mannitol, O-benzylidenesorbitol, di-O-benzylidenesorbitoldiacetate, di-O-(2-chlorobenzylidene)sorbitoldiacetate, tri-O-(4-chlorobenzylidene)sorbitol, O-benzylidenethreitol, O-benzylidene tartaric acid methylester, O-cyclohexylidenglycerine, O-cyclohexylidene ascorbic acid and O-benzylidene-9,10-dihydroxy stearic acid methylester.

Suitably the aldehyde is benzaldehyde, 3-chlorobenzaldehyde or 3-fluorobenzaldehyde especially benzaldehyde. Suitably the polyol is sorbitol, xylitol or mannitol especially sorbitol. The condensation product may be di-O-benzylidene mannitol; di-O-(3-fluorobenzylidene) mannitol or di-O-benzylidene sorbitol especially di-O-benzylidene sorbitol.

The gelling or solidifying agent is useful for the preparation of a stick from the compositions of the present invention.

Suitable gelling agents for inclusion in the compositions of the invention include acetals of sugars, particularly acetals of sorbitol, which are particularly effective as gelling agents. One such gelling agent includes di-O-dibenzylidene sorbitol (also referred to simply as dibenzylidene sorbitol) sold by Roquette Freres, France under the trademark Disorbene™. Other acetals such as those described above have also been found to be useful.

Acetals of sugars, particularly natural sugars, for example acetals of sorbitol, have been previously used as gelling agents for the preparation in stick form and these materials are useful in the present invention.

Suitably the gelling or solidifying agent has a concentration in the composition from about 0.01% to about 20%, such as about 0.01% to about 15%, typically from about 0.05% to about 10% for example about 0.1% to about 5% weight by weight based on the total weight of the composition.

It is desirable that in the primer compositions the active primer component should have a concentration of about 0.001 to about 30% weight by weight based on the total weight of the composition for example from about 0.01 to 20% weight by weight based on the total weight of the composition. Suitable concentrations are about 0.005 to about 15% such as about 0.005 to about 10% weight by weight based on the total weight of the composition for example about 0.001 to about 5% weight by weight based on the total weight of the composition such as 0.01 to about 2% weight by weight based on the total weight of the composition.

Desirably the compositions of the present invention when solidified have the consistency of a soft-solid or waxy mass. The rheological properties of the mass of product should be such that the mass has a stable geometric shape. It is desirable that the shaped mass e.g. a stick, is applicable by manual rubbing against the substrate to which it is to be applied. The soft or semi-solid mass should be shearable under relatively modest manual pressure to allow for ease of application. Under shear forces the solid may liquefy to form a film (or smear) of the composition on the surface. It is desirable that the shaped mass retains its shape, for example when stored at 20° C. for a number of days for example at least about 10 days, more desirably for a number of weeks or months. The compositions exemplified herein have proven to be stable over a number of months in such conditions. The cast composition has the ease of handling advantages of a completely solid material yet remains easily dispensable. PrittStick™ is one commercially available semi-solid mass sold as an adhesive stick which is well known as a dispensable adhesive. Ease of application is achieved with two-part formulations as after both parts are formulated as sticks, both parts may be applied as described above. The same is true for the primer/adhesive systems.

The compositions of the present invention have such concentrations of each of the components to allow the thickness of the coating of any given composition can be controlled to achieve the full effects of this invention.

The present invention also provides a two-part adhesive system comprising (i) at least one anaerobic product and (ii) a cure-promoting composition as described above. Suitable anaerobic products are described below.

The invention also relates to the solidified product of a composition as described above. Suitably the composition is solidified in a desired geometric form, for example in a cylindrical shape. Any suitable shape which allows for ease or handling is desired and such shapes are typically referred to as sticks. One method of preparing a soft-solid or semi-solid mass of a composition described above includes the steps of:

(i) heating a composition comprising (a) at least one inert carrier solvent; (b) at least one primer component; and (c) at least one gelling or solidifying agent, to a desired temperature; and (ii) allowing the composition to cool or cooling the composition sufficiently to set the composition.

Typically the composition will set (solidify to a soft-solid) at a temperature of below about 30° C. for example at about 15–22° C.

The invention also relates to a shaped mass prepared by the method just described and particularly a mass shaped in a stick form.

The formulations of the present invention may contain stabilisers, thickeners, adhesion-promoters, plasticizers, dyes, heat resistant additives, impact resistance modifiers, perfumes, diluents and such like.

It will be appreciated that if the composition is cast before cooling to its set temperature then it will take the shape of the container or mould in which it is cast. It is desirable that the composition be cast in a desired geometric shape for example as a stick for example a stick of a generally cylindrical shape. The person skilled in the art will appreciate that the pre- and post-casting composition will have essentially the same compositional make-up, with mainly physical changes from liquid to solid occurring during casting. Little or none of the composition will be lost during the casting process. The amounts of the various components thus remains essentially unchanged as between the liquid and solidified compositions. No appreciable volume change occurs during casting.

In a further aspect the invention provides a method of bonding a first substrate to a second substrate using compositions or kits according to the present invention.

The invention relates also to a bonded assembly created by a method of the invention. The invention thus discloses the use of an anaerobic composition or a two-part composition in the manufacture of a castable stick composition for example one or more sticks for bonding or sealing between substrates.

The invention also provides an easy to use and consumer-friendly pack comprising:

(i) a shaped mass of a composition according to the invention or at least one-part of a two-part composition of the invention (a cast composition); and (ii) a container for the composition, the container having a mechanism for expelling the shaped mass. Desirably the shaped mass is moveable between a position where the shaped mass projects from the container, and a position where the shaped mass is substantially located (retracted) within the container.

The composition may be cast directly in the container. Normally the container will be tubular and most often of cylindrical shape. The container may be of the type having a displaceable mechanism for example a carrier for displacing the mass of the composition relative to the container. The carrier may move the mass so that it projects from the container, or retract the mass so that it is housed within the container. In this way the mass may be extended for application to a substrate or retracted for storage. The container may comprise a cap for protection of the mass when the composition is not in use. Desirably the container has means for manual adjustment of the position of the mass or carrier, for example where the carrier is reciprocally threaded on a winding mechanism and can thus be extended or retracted by rotation of the winding mechanism in one of two directions.

It will be appreciated by those skilled in the art that a multitude of suitable containers may be used with the shapes masses or sticks of the present invention. Typically used containers are those with propulsion mechanisms to propel the stick out of the container. Many such containers are known for example for deodorants/anti-perspirants, and make-up such as lipstick etc.

DETAILED DESCRIPTION OF THE INVENTION

Figure 1:
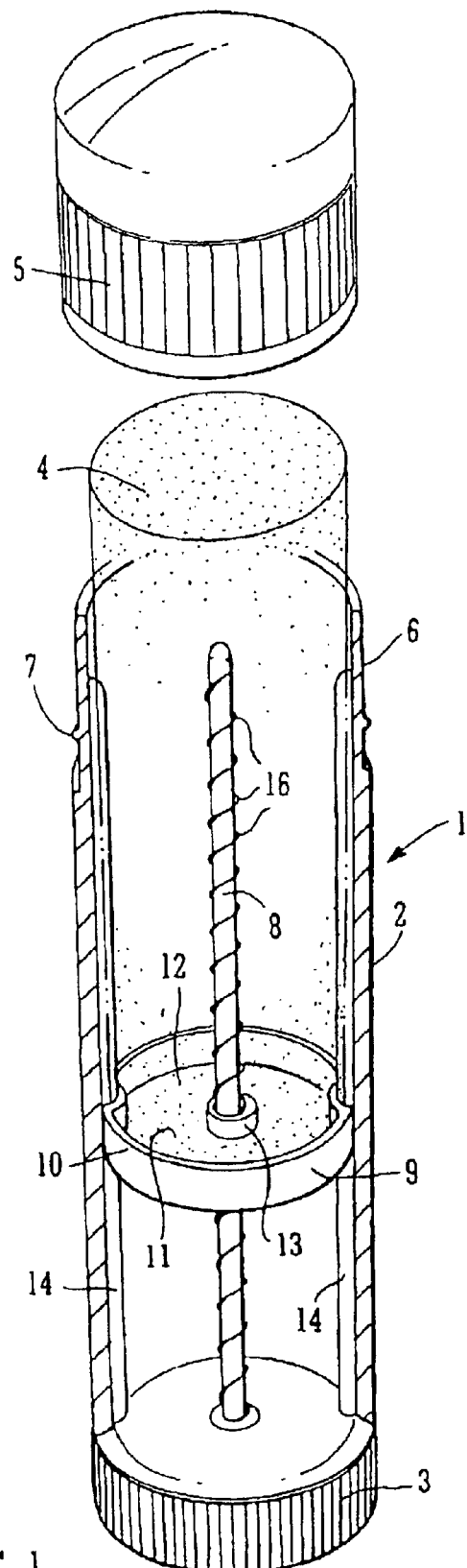
FIG. 1 is a side (part-sectional) elevational view of a container suitable for holding the compositions of the present invention.

The components disclosed below in the documents discussed may be taken and formulated in a composition of the present invention for casting in stick form.

One part of a two- (or multiple-) part system of the present invention (particularly those including anaerobic products) may be considered to be a primer composition. Suitable primer compositions for use with compositions of the present invention in particular anaerobic compositions of the present invention are described in our co-pending Irish application entitled "SEMI-SOLID PRIMER COMPOSITIONS" filed on even date herewith in the name of Loctite (R&D) Limited.

As described in our co-pending application primers may be used to promote the bonding of substrates which otherwise are not readily bonded together to a satisfactory extent by adhesive alone. The primer promotes adhesion to the surface. Materials which do not bond satisfactorily with adhesive alone are often referred to as "difficult-to-bond". Where both surfaces to be bonded are difficult-to-bond, both may be primed prior to attempted adhesion. Primer is applied to the surfaces to be bonded, to "activate" or "prime" the surface for reception of later applied adhesive. Certain primer components are thus often referred to as "adhesion-promoting agents" or "adhesion-promoting primers" as they can promote subsequent adhesion of substrates with a conventional adhesive.

The types of surface (substrate) which are difficult-to-bond with adhesives, especially with cyanoacrylate adhesives, are widely recognised and include non-polar or highly crystalline substrates.

Again as described in our co-pending application a second function of a primer composition may be to promote cure of the curable composition. Primer components which have this function are referred to herein as "cure-promoting". In some instances curable compositions may provide a desired degree of adhesion but achieve adhesion at an undesired rate. For example the curable composition may cure to give sufficient adhesion but may do so only very slowly so that parts to be bonded must be kept in contact over a period of hours or even longer. While relatively long cure times are desirable in some instances, a shorter cure time without deleteriously affecting bond strength is desirable for many other purposes. Slow cure is a property associated with many products including those termed "anaerobic" products. These are polymerizable products which are stable and remain unpolymerized in the presence of air (oxygen in particular) and which tend to cure rapidly in the absence of air.

It is known to provide cure-promoting primer compositions for the purpose of decreasing cure times. In such cases the cure-promoting primer is applied (usually by application in solution form as described below) to the desired substrate and the curable composition is then applied to the surface treated with primer. The cure-promoting primer acts to decrease cure times by accelerating the cure of the composition but without for example diminishing bond strength of adhesives, or sealing capability of sealants.

It is possible that any given primer may have dual functionality i.e. promoting adhesion and promoting cure though it is usual for primers to be classified as having one of these main functions.

The primers of our co-pending application are suitable for use with the present invention.

Anaerobic products with which certain primer compositions (in particular cure-promoting primer components) of the present invention are useful include polymerizable compositions which are often in the liquid state. The (polymerizable) anaerobic product remains unpolymerized in the presence of air but polymerizes upon exclusion of air. This property of anaerobic products finds application as for example a sealant between closely fitting metal surfaces. Anaerobic product placed between closely fitting metal surfaces such as flanges cures due to a lack of air.

Anaerobic products such as adhesives and sealant compositions are known in the art. Examples of documents which describe anaerobically polymerizable compounds include U.S. Pat. Nos. 2,895,950, 3,043,820, 3,218,305 (all to Krieble) and U.S. Pat. No. 4,287,330 (Rich) the entire contents of each of which is expressly incorporated herein by reference.

Suitable anaerobic urethane-acrylate monomers which may be used in compositions of the present invention are disclosed in Gorman et al. in U.S. Pat. No. 3,425,988 (Gorman et al.). These anaerobic urethane-acrylate monomers may be regarded as the reaction product of a polyisocyanate (e.g., toluene diisocyanate) with a mono-acrylate having a reactive hydrogen atom in the alcoholic portion thereof (e.g., hydroxypropyl methacrylate).

Urethane-acrylate monomers are disclosed in U.S. Pat. Nos. 4,309,526 and 4,018,851 (both to Baccei). These monomers may be used in the present invention.

Other monomers useful in all aspects of the present invention particularly anaerobic compositions include those disclosed in U.S. Pat. Nos. 3,720,656, 3,631,154 and 3,651,036.

Methods of using anaerobic system are disclosed in the references mentioned above, as well as in U.S. Pat. Nos. 3,547,851, 3,625,875 and 3,672,942 and 4,007,323 among others. Among the many known uses for anaerobic compositions are threadlocking, impregnation, gasketing, structural adhesives, and manufacture of tapes. The disclosures of all the above patents are incorporated herein by reference.

The invention also embraces a process for adhering or sealing surfaces which comprises applying to at least one of said surfaces the above polymerizable composition, then placing said surfaces in abutting relationship, thereby excluding oxygen and causing the composition to cure, i.e., polymerize.

These polymerisable compounds are typically formulated in a composition which contains at least sufficient components to make the composition curable. The person skilled in the art will, depending on the polymerizable monomer selected, consider any further appropriate components. Typical further components for inclusion include an initiator which may independently initiate or assist initiation of polymerization in the absence of air. These initiators are often oxidising agents. Typical initiators are described above and include peroxides for example hydroperoxides.

A further component which may be added is a reducing agent. Typical reducing agents include tertiary amines and for instance U.S. Pat. No. 4,287,330 (Rich) discloses rhodanine and organic hydrazines which are effective accelerators for the cure of anaerobic compositions. Other suitable reducing agents are well known to those skilled in the art. Another potential component is a co-catalyst (for example saccharine and related compounds described above) which may catalyse polymerization of the polymerizable compounds.

Stabilisers may also be added. Although the quinones are the most desirable stabilisers, sterically hindered monohydric and polyhydric phenols may also be utilized. The groups effecting the steric hindrance are generally alkyl groups of at least 2 carbon atoms, such as tertiary butyl or isopropyl groups; usually in the ortho position of the phenol.

The benzoquinones are particularly desirable quinones. Naphthoquinones, phenanthraquinones and anthraquinones, may also be used. Of these the p-quinones, for example, 1,4-benzoquinone and 2,5-dihydroxy p-benzoquinone are mentioned.

An effective range for the stabilizer is from about 10 parts per million to about 1000 parts per million. More desirably the stabiliser will be present in amounts from 25 to 800 parts per million, with the preferred range being from 200 to 600 parts per million.

The use of primer solutions to facilitate more rapid cure, greater through depth cure, or improve adhesion to substrates has been considered also for anaerobic products. These primer solutions have been proposed in particular for those compositions which do not have readily reachable metal ions or polar groups to facilitate effective adhesion. U.S. Pat. No. 4,990,281 (Clark), U.S. Pat. No. 3,970,505 (Hauser), U.S. Pat. No. 3,591,438 (Toback), U.S. Pat. No. 3,625,930 (Toback), among others disclose the use of various types of primers. The teaching of each of these documents is expressly incorporated herein by reference. A common feature of all these primer composition is that the active ingredient is contained in a solvent and the primer solution has to be applied from the liquid state with a variety of techniques.

The '505 patent teaches the use of in particular a substituted thiourea (in conjunction with an acid) as a cure accelerator for anaerobic products. The substituted thiourea (optionally together with the acid) can be used as a primer to activate the surface to which it is desired to apply anaerobic product. The substituted thiourea can be formulated (optionally together with the acid) in a primer composition of the present invention.

The '438 patent teaches the use of a reducing activator which is either a sulphur-containing free radical accelerator, or a compound containing an oxidizable transition metal. The compounds containing an oxidizable transition metal are especially useful in compositions of the present invention and includes those compounds containing the is following transition metals: Cu, Cr, Co, Fe, and Mn. Desirable compounds include salts and complexes of these metals including mono- or poly-nuclear and homo- or heteronuclear compounds.

Other transition metal-based compounds are disclosed in the '281 patent are desirable for inclusion. These include Cu(II), Co(II), Mn(II), Mn(III) and Cr(II) based compounds in particular salts of these metals. The '281 patent is particularly concerned with the salts of these metals with acid phosphate acrylic monomer. Particular acid phosphate acrylic monomer disclosed include those of the formula:

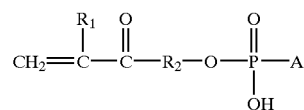

where $R_1$ is H or methyl, $R_2$ is a divalent organic group having from 2 to 20 carbon atoms and the group A is OH or

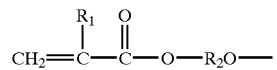

where $R_1$ and $R_2$ are as defined for the formula immediately above.

Suitable metal compounds include copper (I) and (II) salts in particular those of carboxylic acids or those of beta diketones or beta keto esters. Specific examples include for example Cu (II) 2-ethylhexanoate and Cu(II) acetylacetonate.

A representative of a Cu(II) based primer is Loctite product "Primer N™".

Other anaerobic products commercially available from Loctite Corporation include the following products sold under the following trade names Loctite 636, Loctite 326, Loctite 648, Loctite 270, and Loctite 290.

Suitable primer components include those selected from:
(i) 1,5-diazabicyclo[4.3.0]non-5-ene having the formula:

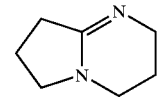

1,8-diazabicyclo[5.4.0]undec-7-ene having the formula:

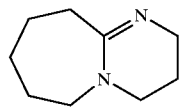

or 1,5,7-triazabicyclo[4.4.0]dec-5-ene having the formula:

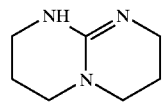

(ii) triphenyl phosphine, or
(iii) ethylenediamine or derivatives of ethylenediamine having the formula:

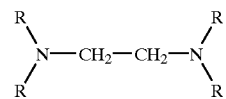

wherein each R, which may be the same or different, represents hydrogen, an alkyl, alkenyl or alkoxy group having 1 to 8 carbon atoms, an aryl group having 6 to 8 carbon atoms, a nitrogen-, sulphur-, or silicon-substituted group having up to 8 carbon atoms or a heterocyclic group having up to 8 carbon atoms which may be unsubstituted or substituted with hydroxy, ether oxygen or sulphur; or (iv) an imidazole having the formula:

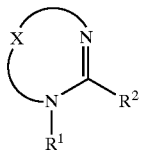

wherein $R^1$ may be hydrogen; an alkyl group that is unsubstituted or substituted with an OH group or with an (alkyl-O)$_3$Si group, wherein the alkyl radical has 1 to 4 carbon atoms; an aryl-alkyl group with 7 to 10 carbon atoms; or an imidazole-CO group, and $R^2$ may be hydrogen or an alkyl, aryl, or aryl-alkyl group with up to 17 carbon atoms, with the condition that one of the substituents $R^1$ or $R^2$ has an aromatic character and X is one of the groups —CH=CH— or —CR$^3$R$^4$—CR$^5$R$^6$— wherein $R^3$, $R^4$, $R^5$ and $R^6$ independently of one another represent hydrogen, an alkyl group with 1 to 4 carbon atoms, or an aryl-alkyl group with up to 17 carbon atoms.

Other imidazole primer compounds useful in the present invention include those of the Formula:

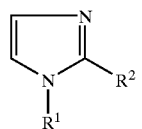

wherein $R^1$ is a $C_1$–$C_4$ alkyl group optionally substituted with a phenyl group, and $R^2$ is hydrogen or a $C_1$–$C_4$ alkyl group.

One commercially available two-part adhesive one or both parts of which could be readily converted to stick form by use of the gelling agents described above is Loctite Multibond™, or the product sold as Loctite 329a/b.

The '930 patent discloses a primer composition for anaerobic adhesives which contains as accelerator a compound having one of the following groups:

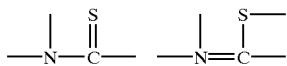

These compounds are also suitable for use with the present invention.

Arylamines suitable for use as reducing agents in the present invention reducing agents to two-part formula:

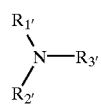

in which $R_{1'}$ is an optionally substituted aryl radical, more especially an optionally alkyl-substituted phenyl radical, $R_{2'}$ has the same meaning as $R_{1'}$ or is an optionally substituted, linear or branched alkyl radical and $R_{3'}$ is a linear or branched alkyl radical which may be substituted, but contains at least one hydrogen atom in the alpha-position to the nitrogen and any two of $R^1$ to $R^3$ may together form a mono- or poly-cyclic ring structure, which may optionally be a fused ring structure, and which in turn may be substituted. Particular compounds within this formula include N,N-dimethyl-p-toluidine having the formula:

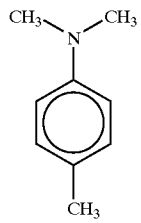

DM-p-T and tetrahydroquinolines.

Further compositions include the following described in turn with reference to prior art references:

An adhesive composition which can be formulated either as a two-part system or as a system utilising a primer is disclosed in U.S. Pat. No. 3,890,407, assigned to E.I. Du Pont DeNemours and Co. The composition comprises a sulphur-bearing component selected from chlorosulphonated polyethylene and a mixture of sulphonyl chloride with chlorinated polyethylene in at least one polymerisable vinyl monomer and an accelerator comprising a primary amine-aldehyde condensation product now known to be dihydropyridine. U.S. Pat. No. 4,112,013 also of E.I. Du Pont DeNemours and Co. which was divided from U.S. Pat. No. 3,890,407 specifies that the chlorosulphonated polyethylene is made from branched polyethylene having a melt index of about 100, the chlorosulphonated polyethylene containing about 43% chlorine by weight and about 34 moles of sulphonyl chloride per 100 grams of polymer and the composition may also comprise a mixture of methylmethacrylate, glacial methacrylic acid and ethyleneglycol dimethacrylate. A further U.S. Pat. No. 4,106,971, also divided from U.S. Pat. No. 3,890,407, relates to a method of bonding two surfaces comprising the above disclosed adhesive compositions.

A bonding accelerator containing a condensation reaction product of an aldehyde and a primary or secondary amine is known from U.S. Pat. No. 3,599,438, assigned to Loctite Corporation, together with a reducing activator comprising either a sulphur-containing free radical accelerator or a compound containing an oxidizable transition metal. Such a condensation reaction product is also known for use in conjunction with a polymerisable acrylate ester monomer and a peroxy polymerisation initiator (U.S. Pat. No. 3,616,040 also of Loctite Corporation).

U.S. Pat. No. 4,430,480, assigned to Loctite Corporation relates to an adhesive composition which comprises a first part comprising a solution of chlorosulphonated polyethylene in at least one polymerisable vinyl monomer, a polymerisation catalyst which comprises at least one free-radical initiator and a second part comprising an activator composition which consists of at least 70% of the condensation reaction product formed between butyraldehyde and aniline.

An improved adhesive composition of this type, enriched in N-phenyl-3,5-diethyl-2-propyl-1,2-dihydropyridine to a concentration of at least about 70% by weight of the condensation reaction products is known from U.S. Pat. No. 4,430,480.

British Patent Specification No. 1113722 of Minnesota Mining and Manufacturing Company discloses aerobic compositions which are polymerisable in the presence of a free radical catalyst which comprises one or more monoand/or bis-acrylate and/or methacrylate monomers which are blended with from 0.05 to 6% by weight of the monomer of a triaryl borane complex. British Patent Specification No. 1251737 of Toyo Soda Manufacturing Company Limited discloses the polymerisation of a vinyl monomer, chloroprene or methyl methacrylate in the presence of a catalyst comprising a trialkyl boron compound and a chloro hydrocarbon mixed in a molar ratio of 1:0.2 to 1:8.0.

The polymerisation of vinyl monomers using catalysts which are either diborane adducts or oligomers based on monomer units which contain at least two borane atoms are disclosed in U.S. Pat. No. 4,167,616 assigned to Rohm and Haas Company. The compositions also include an oxygen source.

U.S. Pat. No. 4,515,724 assigned to Henkel Kommanditgesellschaft Auf Aktien relates to boron alkyl compounds as initiators of free-radical polymerisation, the compounds being esters of a fatty acid or fatty alcohol having at least one boryl radical or organoboron radical attached thereto.

European Patent Application No. 0078994 A1 of Henkel KgaA describes an air-activatable starter system for the polymerisation of olefinic compounds, based on organoboron compounds with improved storage stability even on admission of air, which consists of a homogeneous mixture of at least one organo-boron compound activatable by admission of air with at least one organic oligomer or polymer which at room temperature is fluid to solid and which is inert towards the organo-boron compound.

The majority of these compositions are "two part" systems.

An adhesive composition which is described as being polymerisable either aerobically or anaerobically is disclosed in U.S. Pat. Nos. 4,348,503, and 4,429,088 divided therefrom, of Bachmann, and comprises an acrylic ester monomer capable of free-radical polymerisation and a monomeric polyacrylate ester prepolymer together with a catalyst system which comprises an aromatic perester free-radical precursor, an organic acid and a soluble compound of a transition metal cure accelerator. However this composition requires a separate activator such as an amine-aldehyde condensate.

The cure of two-parts system is typically based on a redox reaction. One reducing agent for inclusion in the cure system for effective polymerisation of the free-radically polymerisable compound, includes at least one compound of a formula which includes the structure I:

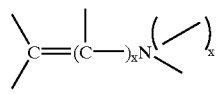

where x is 0 or 1, and where the lines representing unfilled valencies indicate bonds to carbon, hydrogen or hetero atoms,
with the proviso that:
when x=0, the nitrogen atom in structure I is not bonded to a second nitrogen atom;
and when x=1 there is a structure I in the compound in which
the >C=C< moiety does not form part of a phenyl ring;
with the proviso that the composition does not contain a peroxide, or a peroxide precursor which produces peroxide in the absence of air or any ingredient which is a significant source of radicals in the absence of air.

The cure activating compounds may have the general formula II:

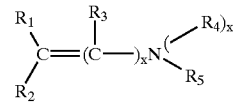

where x is 0 or 1 and $R_1$, $R_2$, $R_3$, $R_4$ and $R_5$, which may be the same or different, are independently selected from hydrogen, hydrocarbyl and heterohydrocarbyl groups, silyl groups, and substituted derivatives of any of the foregoing, and any two of the groups $R_1$ to $R_5$ may together form a mono- or poly-cyclic ring structure, which may optionally be a fused ring structure, and which in turn may be substituted, with the proviso that none of the groups R1 to R5 comprise or contain a group which is known to interfere with polymerisation, and with the same provisos as defined above with respect to the compound of a formula which includes the structure I.

Preferably $R_2$ and $R_5$ form a ring structure such that the cure activating compound has the general formula IIa

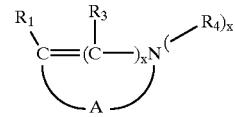

wherein A is a divalent hydrocarbyl or heterohydrocarbyl group which may optionally have a cycloaliphatic or aromatic ring fused thereto and which may be substituted.

The groups $R_1$ and $R_3$ may also suitably form a ring structure.

The term "hydrocarbyl" as used herein includes:
(i) straight chain or branched aliphatic groups including alkyl, alkenyl and alkynyl, preferably containing from 1 to 20, more preferably from 1 to 10, most preferably from 1 to 5 carbon atoms; and alkylene and alkenylene groups forming part of a ring structure which preferably contains from 3 to 30, more preferably 5 to 20 carbon atoms;
(ii) aromatic groups including aryl, alkaryl and aralkyl groups.

The term "heterohydrocarbyl" as used herein includes hydrocarbyl groups as described above interrupted by a heteroatom selected from oxygen, nitrogen or sulphur.

The term "acyl" refers in particular to $C_2$–$C_{40}$ preferably $C_2$–$C_{20}$ acyl groups.

The term "substituted" or "substituted derivative" as used herein includes the appropriate group substituted with one or more oxygen, nitrogen, sulphur or halogen atoms or atom-containing moieties, or with one or more hydrocarbyl or heterohydrocarbyl groups, which in turn may be substituted with one or more oxygen, nitrogen, sulphur or halogen atoms or atom-containing moieties. The halogen may be chlorine, bromine, fluorine or iodine. Exemplary of suitable $R_1$-$R_5$ groups as well as substituents on a ring structure are hydrogen, $C_1$–$C_5$ alkyl, $C_1$–$C_5$ alkoxy, phenyl, alkoxyphenyl, benzyl, cyclohexyl, amide or trialkyl silyl groups.

Suitable cure activating compounds include those described in U.S. Pat. No. 5,610,251 partially hydrogenated pyridines, condensation products of cyclic ketones and ureas, Schiff's Bases, indoles, pyrroles, imidazoles, piperazines, carbazoles and tetrahydroquinolines and substituted derivatives thereof.

The composition may also contain a soluble ionic salt, particularly a cobalt or iron salt.

The cure system of the composition may contain a peroxide such as hydroperoxide in particular cumene hydroperoxide. Dihydropyridines may be optionally used in conjunction with a hydroperoxide in the cure system. Suitable dihrdropyridines include the following:

Alkyl and cycloalkyl may refer to $C_1$–$C_{30}$ and $C_3$–$C_{30}$ containing groups respectively, alkenyl and cycloalkenyl may refer to those groups containing $C_2$–$C_{30}$ and $C_3$–$C_{30}$ containing groups. Aryl, alkoxy and aryloxy groups desirably containing up to 30 carbon atoms; aryl and aryloxy groups containing up to 20 carbon atoms, alkoxy groups being desirably a $C_1$–$C_{20}$ group.

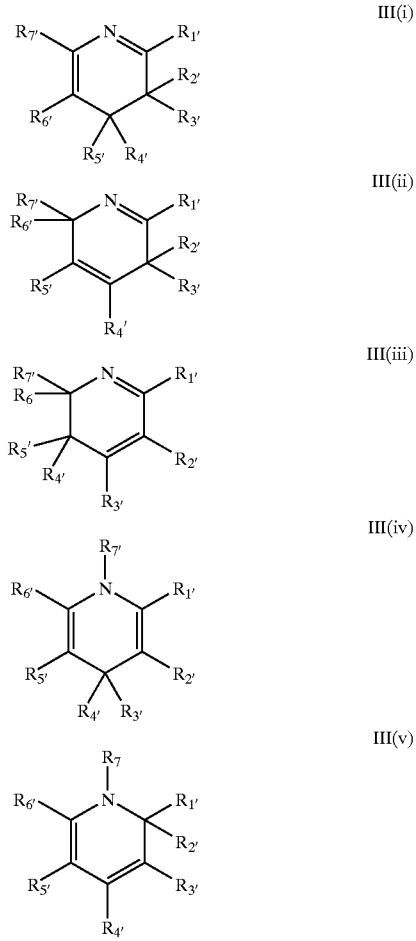

wherein $R_1'$ to $R_7'$ have the same meanings and provisos as $R_1$ to $R_5$ above. Compounds of formula III (iv) and III (v) are preferred, $R_7'$ preferably being other than hydrogen, and more preferably being an electron-donating group.

Particular useful hydropyridines include:
N-butyl-2-propyl-3,5-diethyl-1,2-dihydropyridine, N-phenyl-2-propyl-3,5-diethyl-1,2-dihydropyridine, N-(4'-methoxyphenyl)-2-propyl-3,5-diethyl-1,2 dihydropyridine, N-(cyclohexyl)-2-propyl-3,5-diethyl-1,2-dihydropyridine, N-benzyl-1,4-dihydronicotinamide, N-trimethylsilyl-1,4-dihydropyridine, 1,4-dihydropyridine, ethyl-2,4-dimethyl-1,4-dihydronicotinate, 2-methyl-3-phenyl-3,4,5,6-tetrahydropyridine, 2-benzyl-3-phenyl-3,4,5,6-tetrahydropyridine.

Also useful as oxidixing agents in two-part compositions of the present invention include those compounds now to be described as "initiators". Typical of useful initiators for inclusion in compositions of the invention, and in particular two-part compositions are any of a wide variety of known peroxy initiators. Illustrative of such initiators are the diacyl peroxides such as benzoyl peroxide; dialkyl peroxides such as di-tert.-butyl peroxide or 2,5-dimethyl-2,5-di(t-butyl peroxy) hetane and dicumyl peroxide, diisopropyl-benzene hydroperoxide; ketone peroxides such as methylethyl ketone peroxide; and peresters which readily hydrolyze, e.g. tert.-butyl peracetate, tert.-butyl perbenzoate, di-tert.-butyl diperphthalate, etc. A particularly useful class of peroxy initiators are the organic hydroperoxides such as cumene hydroperoxide; ketone peroxides such as, methylethyl ketone hydroperoxide, tert.-butyl hydroperoxide, etc. Of these, cumene hydroperoxide is especially desired. Acylperoxides such as lauroyl peroxide and benzoyl peroxide may be used. The initiators may be used at a concentration of about 0.01% to about 10% by weight of the total formulation, preferably 0.1% to about 5% by weight. Another useful class of initiators comprises carbonyl-containing ultraviolet-activated free radical generators, such as acetophenone, benzophenone, and the benzoin ethers. The skilled person will be aware of other suitable initiators. Initiator mixtures may also be used.

In the embodiment the solvent for the cure system for two-part compositions of the present invention may be a polymerisable monomer or oligomer may interact with the polymerization process and thus form part of the cured product. The monomer or oligomer should provide the desired concentration of the curing system. The solvent may thus for example methyl or ethyl methacrylate.

A container for holding a cast (solidified) composition of the invention is now described.

FIG. 1 shows a side view of a container 1 suitable for holding a one-part or one or (in separate containers) both parts of a two-part composition of the present invention. The container is cylindrical in cross-section having cylindrical side walls 2. On the base of the container is a knurled wheel 3 which forms part of a propulsion mechanism for a (soft-solid or semi-solid) mass or stick 4 of a composition of the present invention. The mass 4 has been cast in a generally cylindrical shape as described in the Examples below. The container further comprises a cap 5 which is snap-fit engageable over the top end 6 of the container 1 to protect the mass 4 of product. The top end 6 is of lesser diameter than the side walls 2 and has a rim 7 which engages in a corresponding recess on the underside of the cap 5 to secure the cap 5 in place.

Figure 2:
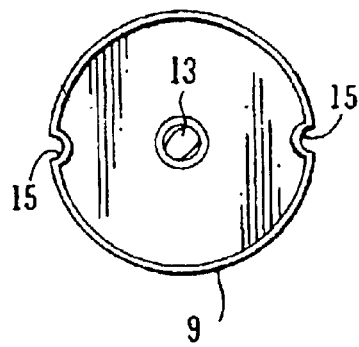
FIG. 2 is a top view of a carrier which forms part of the container of FIG. 1.

The knurled wheel 3 is attached to an elongate drive or winding shaft 8 which is centrally located within the housing formed by the side walls of the container. On the winding shaft 8 is located a moveable carrier 9. The carrier 9 is generally cylindrical (from an end view thereof—see for example FIG. 2) and has a short peripheral upstanding wall 10 formed on its base 11. During the casting process the carrier 9 is positioned to secure itself to the lower end 12 of the mass 4 on solidification of the mass 4. Indeed the mass 4 may be cast also with the shaft 8 (and optionally the wheel 3) in place. As best seen from FIG. 2 the carrier 9 has a central threaded aperture 13 in which the threads 16 of the shaft 8 engage. The knurled wheel 3 and the shaft 8 are both mounted for relative rotation to the container body. When the wheel 3 is turned in the direction of the arrow it moves the carrier up or down the shaft 8 thus controlling the relative position of the mass and the container. In the position shown the carrier has travelled part way up the shaft, moving the mass to a position where it protrudes from the container. The composition can then be applied by rubbing the mass against a substrate by manual force. Sufficient shearing of the mass takes place to allow it to rub off onto the substrate. No separate applicator/brush etc. is necessary. The composition can be applied with manual pressure. To prevent rotation of the carrier 9 with the shaft, elongate ribs 14 are provided on opposing sides of the internal wall of the container. The ribs 14 run from the base of the container to a position proximate to the mouth if the container. The ribs 14 each engage one of corresponding grooves 15 in the carrier 9 thus preventing relative rotation of the container and the carrier and ensuring that the carrier moves upwardly or downwardly when the shaft 8 turns. The carrier 9 and the mass 4 can be retracted by rotation of the wheel 3 in an opposing direction.

The words "comprises/comprising" and the words "having/including" when used herein with reference to the present invention are used to specify the presence of stated features, integers, steps or components but does not preclude the presence or addition of one or more other features, integers, steps, components or groups thereof.

The following examples will serve to illustrate the invention.

EXAMPLES

General

In the following examples the dibenzylidene sorbitol used was the product Disorbene™ described above.

Bonding tests were carried out using various substrates described in the appropriate examples. The bond strength of the resulting joints was determined using conventional methods, following standard test method ASTM D 1002. Tensile, break and prevail strengths were determined in accordance with ASTM 0649.

Example 1

An adhesive composition comprising the following components was formulated

| | |
|---|---|
| Hydroxy propyl methacrylate | 100 g |
| Acrylic acid | 6 g |
| Saccharin | 0.96 g |
| Acetylhydrazine | 0.96 |
| Cumene hydroperoxide | 1.90 g |
| Sodium Ethylene diamine tetra acetic acid salt solution | 0.2 g |
| Hydroquinone | 0.01 g |
| Dibenzylidene Sorbitol | 1.5 g |

1.5 g of Dibenzylidene Sorbitol was dissolved in heated hydroxy propyl methacrylate (100 g) with vigorous stirring and the solution allowed to cool for a short period. Then the remaining components were added was added with stirring and the solution was allowed to cool further. The solution was then cast into empty stick cartridges of the type typically used for adhesives such as PrittStick™ (and as described above) and was allowed to cool to room temperature. During this time the solution solidified. The solidified stick was clear (transparent) resembling a frozen mass. The solid stick primer solution could then be extruded using the cartridge's inbuilt propulsion mechanism. The adhesive sticks was tested as adhesive on grit blasted mild steel (GBMS), laps of dimensions 100 mm×25 mm and 2 mm in thickness which were carefully degreased with acetone.

Samples of the adhesive were applied to the mild steel lap and then used to form an adhesive joint with a second metal lap that had been primed with a (1000 ppm Cu) copper (II) dimethyl 1,3 diacetone dicarboxylate methanolic solution. The adhesive joint had fixtured within 2 minutes.

The aforementioned adhesive semi-solid solution was applied as a threadlocker on black oxide nuts and bolts that had been primed with a (1000 ppm Cu) copper (II) dimethyl 1,3 diacetone dicarboxylate methanolic solution. The results are presented in the following table.

| | Bond Strengths | | |
|---|---|---|---|
| | Tensile/MPa | Break Nm | Prevail Nm |
| GBMS/GBMS | 12.8 | | |
| Black Oxide | | 7.8 | 25 |

Example 2

A two-part adhesive composition (#A and #B) comprising the following components was formulated

| | #A | #B |
|---|---|---|
| Polyethylene glycol dimethacrylate | | 100 g |
| Hydroxy propyl methacrylate | 100 g | |
| Acrylic acid | 6 g | 6 g |
| Saccharin | 0.96 g | 0.96 g |
| Acetylhydrazine | 0.96 | 0.96 |
| Cumene hydroperoxide | 1.90 g | 1.90 g |
| Sodium Ethylene diamine tetra acetic acid salt solution | 0.2 g | 0.2 g |
| Hydroquinone | 0.01 g | 0.01 g |
| Dibenzylidene Sorbitol | 1.5 g | 1.0 g |

Part #A (100 g) and Part #B (60 g) were mixed at 90° C. and allowed to cool and filled into empty cartridges and tested as in Example 1.

| | Bond Strengths | | |
|---|---|---|---|
| | Tensile/MPa | Break Nm | Prevail Nm |
| GBMS/GBMS | 8.0 | | |
| Black Oxide | | 10.4 | 29 |

Example 3

A two-part adhesive composition (#A and #B) was prepared with the following components,

| | #A | #B |
|---|---|---|
| Hydroxy propyl methacrylate | 100 g | 100 g |
| N,N Dimethyl p-Toluidine | 2.0 g | |
| Benzoyl Peroxide | | 2.0 g |
| Dibenzylidene Sorbitol | 2.0 g | 2.0 g |

The adhesives were tested by applying parts A and B separately to the substrates and then assembling the substrates to adhesive joints giving the following results on grit blasted mild steel

| | Bond Strengths Tensile/MPa |
|---|---|
| GBMS/GBMS | 5.6 |

What is claimed is:

1. A composition including
   (i) at least one anaerobically polymerizable compound comprising an acrylate or methacrylate compound with at least two acrylate or methacrylate functional groups, respectively; and
   (ii) at least one condensation product of an aldehyde and/or ketone with a polyol, wherein the composition is is in the form of a stick.

2. A composition according to claim 1 wherein the anaerobically polymerizable compound is at least one of the formula:

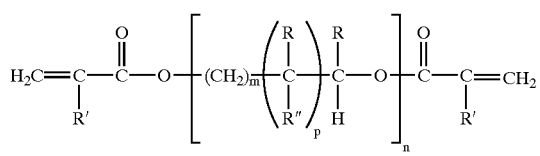

wherein R is a radical selected from hydrogen, C–C$_4$ alkyl, or C$_1$–C$_4$ hydroxyalkyl or

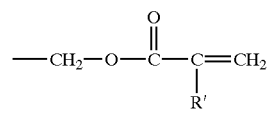

radicals, R' is selected from hydrogen, halogen, and C$_1$–C$_4$ alkyl, OH; and R" is selected from hydrogen, —OH radical, and

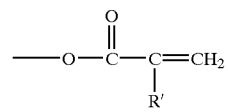

radicals; m is an integer equal to at least one, n is an integer equal to at least 2, and p is 0 or 1.

3. A composition according to claim 1 further comprising a reducing agent.

4. A composition according to claim 3 wherein the reducing agent is a member selected from the group consisting of at least one of:
   (i) arylamines of the formula:

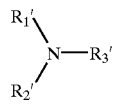

in which R$_1$' is an optionally substituted aryl radical, more especially an optionally alkyl-substituted phenyl radical, R$_2$' has the same meaning as R$_1$' or is an optionally substituted, linear or branched alkyl radical and R$_3$' is a linear or branched alkyl radical which may be substituted, but contains at least one hydrogen atom in the alpha-position to the nitrogen and any two of R$_1$, to R$_3$, may together form a mono- or poly-cyclic ring structure, which may optionally be a fused ring structure, and which in turn may be substituted;
   (ii) a compound comprising the formula

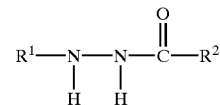

wherein R$^1$ is phenyl substituted with C$_1$–C$_4$ alkyl group and R$^2$ is selected from the group consisting of hydrogen, alkyl, cycloalkyl, alkenyl, cycloalkenyl, aryl, alkoxy, aryloxy, carbonyl, amino and the following groups:

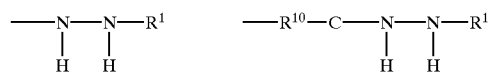

wherein R$_{10}$ is selected from the group consisting of alkylene groups containing one to about 10 carbon atoms;
   (iii) sulphonyl hydrazines; and
   (iv) tetrahydroquinolines.

5. A composition according to claim 3 wherein the reducing agent is a member selected from the group consisting of:
   (i) N,N-dimethyl-p-toluidine or N,N-diethyl-p-toluidene;
   (ii) 1-acetyl-2-phenyl hydrazine, 1-acetyl-2(p-tolyl) hydrazine, and 1-formyl-2-phenyl hydrazine;
   (iii) paratoluene sulphonylhydrazine; and
   (iv) 1,2,3,4,-tetrahydroquinoline.

6. A composition according to claim 3 wherein the reducing agent is present in amounts from about 0.05% to about 10% by weight based on the total weight of the composition.

7. A composition according to claim 1 further comprising an oxidizing agent.

8. A composition according to claim 7 wherein the oxidizing agent is a peroxy compound.

9. A composition according to claim 8 wherein the peroxy compound is a hydroperoxide.

10. A composition according to claim 8 wherein the oxidizing agent is present in amounts from about 0.5% to about 10% by weight based on the total weight of the composition.

11. A composition according to claim 1 further comprising an accelerator.

12. A composition according to claim 11 wherein the accelerator is present in amounts from about 0.01% to about 10% by weight based on the total weight of the composition.

13. A composition according to claim 1 wherein the composition further comprises a stabiliser.

14. A composition according to claim 1 wherein the aldehyde is a member selected from the group consisting of benzaldehyde, 3-chlorobenzaldehyde and 3-fluorobenzaldehyde.

15. A composition according to claim 1 wherein the polyol is a member selected from the group consisting of sorbitol, xylitol and mannitol.

16. A composition according to claim 1 wherein the gelling or solidifying agent is an acetal of sugar.

17. A composition according to claim 1 wherein the gelling or solidifying agent is an acetal of sorbitol.

18. A composition according to claim 1 wherein the gelling or solidifying agent is a dibenzylidene sorbitol.

19. A composition according to claim 1 wherein the gelling or solidifying agent has a concentration in the range of from about 0.01% to about 20% by weight based on the total weight of the composition or that part of a two-part composition it is in.

20. A method of preparing a shaped mass from the composition according to claim 1 comprising the steps of:
   (i) heating a composition according to claim 1 to a desired temperature; and
   (ii) allowing the composition to cool or cooling the composition sufficiently to set the composition.

21. A method of bonding a first substrate to a second substrate comprising the steps of applying of an adhesive composition according to claim 1 in one part or two-parts as appropriate and bringing the substrates together to form a bond assembly.

22. A method of sealing a space between two substrates comprising applying to at least one of the substrates an anaerobic composition according to claim 1, and bringing the substrates together to exclude oxygen/air.

23. A pack comprising:
   (i) a shaped mass of a composition according to claim 1; and
   (ii) a container for the composition, the container having a mechanism for expelling the shaped mass.

24. A composition according to claim 1 wherein the anaerobically polymerizable compound further contains hydroxy propyl methacrylate.

25. A kit comprising:
   (i) a first composition including:
      (a) at least one primer component;
      (b) at least one carrier solvent for the primer component; and
   (ii) a second composition which is a composition according to claim 1.

26. A kit according to claim 25 wherein the first composition further includes at least one gelling or solidifying component.

27. A kit according to claim 26 where both compositions are in soft-solid form.

28. A method of bonding a first substrate to a second substrate comprising the steps of priming at least one of the substrates by application of a primer composition and subsequently applying an adhesive composition to the primed surface and bringing the substrates together to form a bond assembly, the primer composition and the adhesive composition being in the form of a kit according to claim 25.

29. A bond assembly prepared by bonding a first substrate to a second substrate by the method of claim 28.

30. A composition comprising:
   (i) a first part containing at least one polymerizable compound; and
   (ii) a second part containing at least one curing component for polymerizing the composition wherein at least one of the first or second parts additionally comprises:
   (iii) at least one gelling or solidifying agent; and
   wherein the at least one polymerizable compound is a compound of the formula $$H_2C=C(R')-C(=O)-O-[(CH_2)_m-(C(R'')(R)/_p-C(R)(H))-O]_n-C(=O)-C(R')=CH_2$$

wherein R is a radical selected from the group consisting of hydrogen, $C_1$–$C_4$ alkyl, $C_1$–$C_4$ hydroxyalkyl and $$-CH_2-O-C(=O)-C(R')=CH_2$$

radicals, R' is selected from hydrogen, halogen, and $C_1$–$C_4$ alkyl, OH; and R" is selected from the group consisting of hydrogen, —OH radical, and $$-O-C(=O)-C(R')=CH_2$$

radicals; m is an integer equal to at least one, n is an integer equal to at least 2, and p is 0 or 1.

31. A composition according to claim 30 wherein the gelling or solidifying agent has a concentration in the range of from about 0.1 to about 5% by weight based on the total weight of the composition or that part of a two-part composition it is in.

32. A composition according to claim 30 wherein the polymerizable compound further contains hydroxy propyl methacrylate.

33. A two-part composition comprising:
   (i) a first part containing at least one polymerizable compound; and
   (ii) a second part containing at least one curing component for polymerizing the composition,
   wherein at least one of the first or second parts additionally comprises:
   (iii) at least one gelling or solidifying agent; and
   wherein the at least one polymerizable compound is selected from at least one of acrylates, methacrylates, styrene, maleate esters, fumarate esters, unsaturated polyester resins, alkyd resins, thiol-ene compositions, and acrylate, methacrylate, or vinyl terminated silicones and urethanes, wherein at least one part of the composition further includes a reducing agent.

34. A composition according to claim 33 wherein the reducing agent is selected from one or more of:
   (i) arylamines of the formula:

$$R_{1'}\diagdown N-R_{3'} \atop R_{2'}\diagup$$

in which $R_{1'}$ is an optionally substituted aryl radical, more especially an optionally alkyl-substituted phenyl radical, $R_{2'}$ has the same meaning as $R_{1'}$ or is an optionally substituted, linear or branched alkyl radical and $R_{3'}$ is a linear or branched alkyl radical which may be substituted, but contains at least one hydrogen atom in the alpha-position to the nitrogen and any two of $R_1$, to $R_3$, may together form a mono- or poly-cyclic ring structure, which may optionally be a fused ring structure, and which in turn may be substituted;

(ii) a compound having the formula

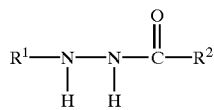

wherein $R^1$ is phenyl substituted with $C_1$–$C_4$ alkyl group and $R_2$ is selected from the group consisting of hydrogen, alkyl, cycloalkyl, alkenyl, cycloalkenyl, aryl, alkoxy, aryloxy, carbonyl, amino and the following groups:

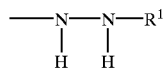 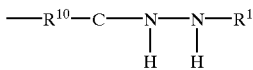

wherein $R^{10}$ is selected from the group consisting of alkyl groups containing one to about 10 carbon atoms;
(iii) sulphonyl hydrazines;
(iv) tetrahydroquinones;
(v) hydropyridines; or
(vi) beta keto esters.

35. A composition according to claim 34 wherein the reducing agent is a member selected from the group consisting of one or more of:
(i) N,N-dimethyl-p-toluidine or N,N-diethyl-p-toluidene;
(ii) 1-acetyl-2-phenyl hydrazine; 1-acetyl-2(p-tolyl) hydrazine; and 1-formyl-2-phenyl hydrazine;
(iii) paratoluene sulphonylhydrazine;
(iv) 1,2,3,4,-tetrahydroquinone;
(v) a dihydropyridine or tetrahydropyridines; and
(vi) methylcyclohexane carboxylate, ethylcyclohexane carboxylate, methylcyclopentane carboxylate, and ethylcyclopentane carboxylate.

36. A composition according to claim 35 wherein the reducing agent is a member selected from the group consisting of one or more of N-butyl-2-propyl-3,5,-cliethyl-1,2-dihydropyridine, N-phenyl-2-propyl-3,5-diethyl-1,2-dihydropyridine, N-(4'-methoxyphenyl)-2-propyl-3,5-diethyl-1,2-dihydropyridine, N-(cyclohexyl)-2-propyl-3,5-diethyl-1,2-dihydropyridine, N-benzyl-1,4-dihydronicotinamide, N-trimethylsilyl-1,4-dihydropyridine, 1,4-dihydropyridine, ethyl-2,4-dimethyl-1,4-dihydronicotinate, 2-methyl-3-phenyl-3,4,5,6,-tetrahydropyridine, 2-benzyl-3-phenyl-3,4,5,6-tetrahydropyridine and combinations thereof.

37. A composition according to claim 33 wherein the reducing agent is present in amounts from about 0.05% to about 10% by weight based on the total weight of that part of the composition it is in.

38. A composition according to claim 33 wherein the gelling or solidifying agent has a concentration in the range of from about 0.1 to about 5% by weight based on the total weight of the composition or that part of a two-part composition it is in.

39. A two-part composition comprising:
(i) a first part containing at least one polyrnerizable compound; and
(ii) a second part containing at least one curing component for polymerizing the composition wherein at least one of the first or second parts additionally comprises:
(iii) at least one gelling or solidifying agent; and at least two of the conditions (a) to (d) is fulfilled:
(a) the at least one polymerizable compound is not an epoxy;
(b) the at least one polymerizable compound is selected from at least one of acrylates, methacrylates, styrene, maleate esters, fumarate esters, unsaturated polyester resins, alkyd resins, thiol-ene compositions, and acrylate, methacrylate, or vinyl terminated silicones and urethanes;
(c) the at least one polymerizable compound is anaerobically polymerizable; and
(d) the at least one polymerizable compound is free radically polymerisable, wherein the second part of the composition further comprises a metal component selected from the group consisting of a transition metal and a salt or complex of a transition metal.

40. A composition according to claim 39 wherein the transition metal is selected from the group consisting of one or more of Fe, Cu, Cr and Mn.

41. A composition according to claim 39 wherein the metal component is selected from the group consisting of one or more of Cu(II)2-ethylhexanoate and Cu(II) acetylacetonate.

42. A composition according to claim 39 wherein the gelling or solidifying agent has a concentration in the range of from about 0.1 to about 5% by weight based on the total weight of the composition or that part of a two-part composition it is in.

43. A method of preparing a shaped mass from a composition comprising:
(i) a first part containing at least one polymerizable compound; and
(ii) a second part containing at least one curing component for polymerizing the composition wherein at least one of the first or second parts additionally comprises:
(iii) at least one gelling or solidifying agent; and at least two of the conditions (a) to (d) is fulfilled:
(a) the at least one polymerizable compound is not an epoxy;
(b) the at least one polymerizable compound is selected from at least one of acrylates, methacrylates, styrene, maleate esters, fumarate esters, unsaturated polyester resins, alkyd resins, thiol-ene compositions, and acrylate, methacrylate, or vinyl terminated silicones and urethanes;
(c) the at least one polymerizable compound is anaerobically polymerizable; and
(d) the at least one polymerizable compound is free radically polymerisable, said method comprising the steps of:
(i) heating at least that part of the composition containing the gelling or solidifying agent to a desired temperature; and
(ii) allowing that part of the composition to cool or cooling the composition sufficiently to set the composition, wherein both parts of the composition contain the gelling agents and both are set according to this method.

44. A shaped mass or shaped masses prepared by the method of claim 43 in stick form.

* * * * *